United States Patent [19]

Reinecke et al.

[11] 4,125,290
[45] Nov. 14, 1978

[54] VEHICLE LOAD-CONTROLLED BRAKE PRESSURE REGULATING VALVE DEVICE

[75] Inventors: Erich Reinecke, Burgdorf; Helmut Ulrich, Springe, both of Fed. Rep. of Germany

[73] Assignee: WABCO Westinghouse GmbH, Hanover, Fed. Rep. of Germany

[21] Appl. No.: 823,779

[22] Filed: Aug. 11, 1977

[30] Foreign Application Priority Data

Sep. 25, 1976 [DE] Fed. Rep. of Germany ....... 2643296

[51] Int. Cl.² .............................................. B60T 8/22
[52] U.S. Cl. ..................................... 303/22 R; 303/40
[58] Field of Search ........... 188/195; 303/22 A, 22 R, 303/23, 40

[56] References Cited

U.S. PATENT DOCUMENTS 3,285,674  11/1966  Eaton ................................ 303/22 R Primary Examiner—Duane A. Reger
Attorney, Agent, or Firm—R. S. Visk; R. W. McIntire, Jr.

[57] ABSTRACT

A vehicle load-controlled brake pressure regulating valve device which combines in one housing a unitary valve device performing dual functions of a vehicle load responsive control valve and of a relay valve, whereby the relay valve function is effected by pressure regulated by the vehicle load function. The dual purpose valve device functions as a unit in a single housing to thereby reduce manufacturing costs and installation space required.

7 Claims, 5 Drawing Figures

VEHICLE LOAD-CONTROLLED BRAKE PRESSURE REGULATING VALVE DEVICE

BACKGROUND OF THE INVENTION

Response and pressure build-up time for air brake systems must meet guidelines, such as established by various governmental agencies, for example. These requirements are met by installing relay valves in the brake systems. It has been found, however, that the times for response and pressure build-up could still be reduced. By installing load-controlled brake pressure regulators, brake pressure control is obtained which is dependent upon the load weight of the vehicle and with which the respective brake forces on the axles for effecting deceleration are adjusted relative to one another in such a manner that the maximum frictional resistance at all the wheels is approximately the same. The guidelines above referred to regarding the observance of adhesion curves which represent the relationship of deceleration to coefficient of adhesion, require the installation of automatic load-controlled brake pressure regulators in commercial vehicles and trailers.

The installation of such valve arrangements within a brake system, as above described, requires more space for installation and a relatively high cost for construction of the individual valve devices themselves, as well as the pipes for connecting them. The use of load-controlled brake pressure regulators and relay valves, which are connected therewith and which are controlled by the regulated brake pressure, are presently known. In such an arrangement, the relay valve is connected with a fluid pressure source, such as a reservoir, for example, and, in well known manner, causes fluid pressure to be supplied from the reservoir to the brake cylinders, as a function of the regulated brake pressure supplied. A further disadvantage in addition to those previously mentioned, is the fact that a relatively long time interval lapses from the moment the brake valve is actuated until the full brake pressure effect in the brake cylinders is attained (response time plus pressure build-up time).

SUMMARY OF THE INVENTION

Accordingly, the object of the present invention is to provide an improved brake system of the type described which operates in a manner that a minimum time interval lapses between acutation of the brake valve and attainment of full brake cylinder pressure.

The object of the invention is attained by combining a brake pressure control valve with a relay valve, according to the invention, so that the function of a conventional brake pressure regulator and the function of a conventional relay valve are obtained in a practical manner by using the dual purpose valve device. In this case, a brake pressure regulating piston of the combined valve device converts the control movement for the control pressure, which is usually produced by the brake pressure regulator and supplied to the relay valve, so to speak, directly into a corresponding movement of the relay valve piston which directly actuates the control valve so as to admit pressure from the fluid pressure supply reservoir to the brake cylinders. As a result, the time period or interval between the moment of brake valve actuation until attainment of full brake pressure effect in the brake cylinders, i.e. the sum of the response time and pressure build-up time, is shortened considerably. A further advantage is the substantial reduction in space required for installation as compared with the known systems, since, on the whole, fewer moving parts are needed. A substantial part of the pipe normally used is eliminated. Thus, the number of possible sources of defects is reduced and consequently the system is more reliable and the costs for production and assembling of the invention are also accordingly reduced.

DESCRIPTION AND OPERATION

Figure 1:
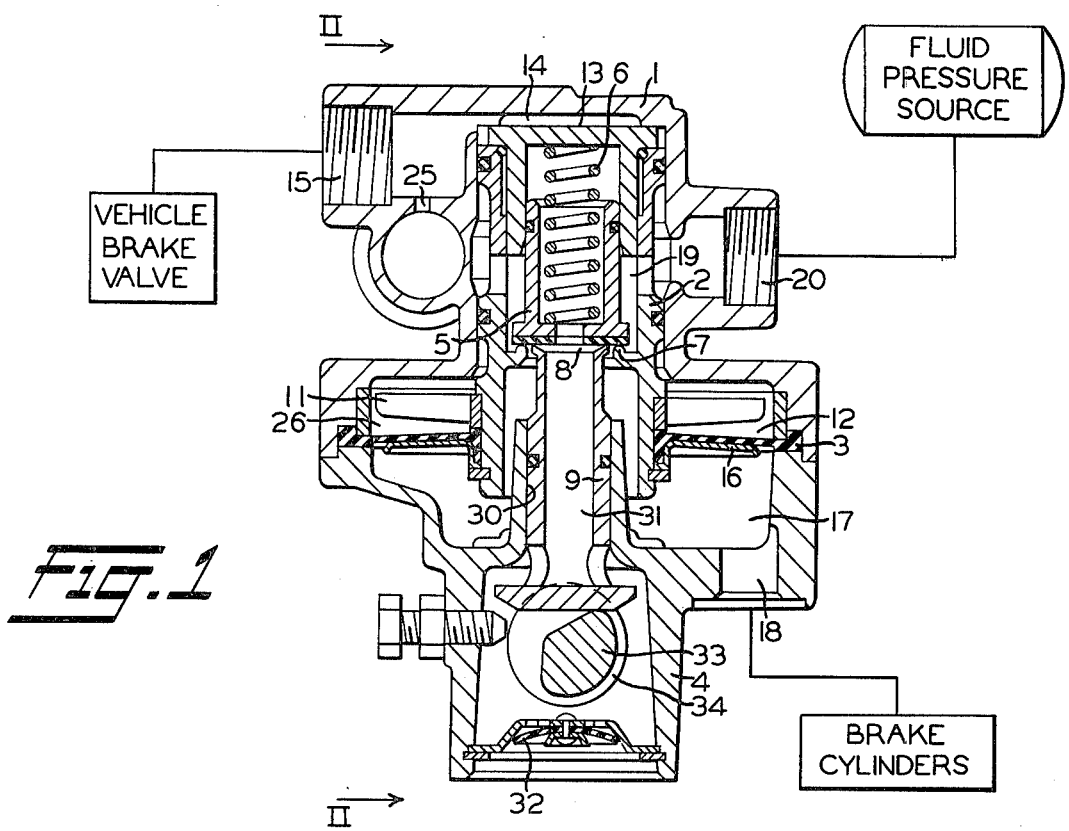
FIG. 1 is a sectional view of a preferred form of the load-controlled brake power regulating valve device according to the invention.
Figure 2:
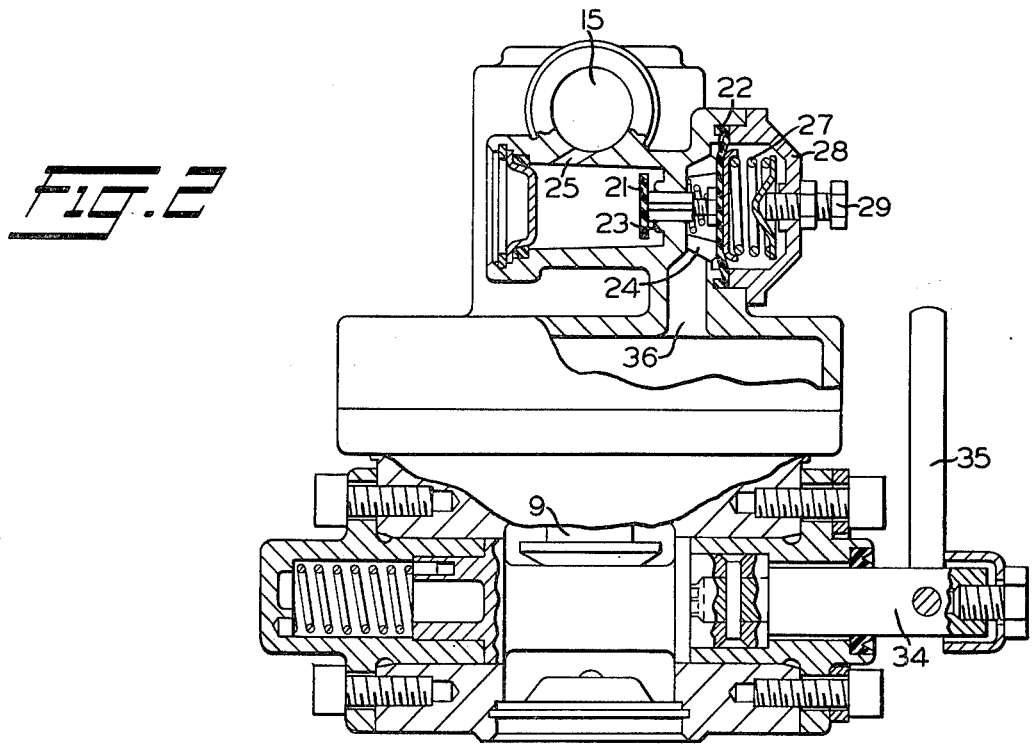
FIG. 2 is a partially sectionalized view of the brake power regulating valve device shown in FIG. 1 and as viewed from the left thereof in the direction indicated by the arrows II.

In an upper part of a sectionalized housing, there is provided a relay valve portion comprising a relay piston 2 having coaxially secured thereto at the lower end thereof an inner periphery of a control diaphragm 3 secured at its outer periphery between upper casing part 1 and a lower casing part 4. Piston 2 has coaxially operably disposed therein a two-way valve member 5 which is biased downwardly, as viewed in the drawing, by a spring 6 compressedly disposed between said valve member and an upper end of said piston. Valve member 5 cooperates with a supply valve seat 7 formed on the inner wall of piston 2 and with an exhaust valve seat 8 surrounding the upper end of a hollow rod member 9 axially aligned underneath the two-way valve member 5. Two-way valve member 5, therefore, cooperates with supply valve seat 7, in a supply position and exhaust valve seat 8, in an exhaust position to function as both a supply and exhaust valve. The piston 2 is provided with a plurality of radially outwardly extending fins 11 the lower surface of which are in an opposingly facing relation to diaphragm 3 to form a conically-shaped contour.

Housing part 1 is provided with a corresponding number of radially inwardly extending fixed fins 12 which are so positioned and spaced as to fit within the interspaces of fins 11 without making contact therewith, said fins 12 also having lower surfaces which also form a cone-shaped contour tapered oppositely to that formed by said fins 11 and making contact with diaphragm 3, as shown in FIG. 1.

Diaphragm 3, as above noted is secured at its outer periphery between housing parts 1 and 4, and is secured at its inner periphery to relay piston 2, said piston and diaphragm thus forming the relay valve portion above mentioned. Relay piston 2 has an upper pressure area 13 of fixed dimension and forming part of an actuating chamber 14 which is located above the relay piston 2 and communicates with a fluid pressure control passageway 15 via which said chamber is communicated with the motor vehicle brake valve and/or the trailer brake valve shown symbollically. The under side of diaphragm 3 comprises pressure area 16 which partially defines a delivery chamber 17 the volume of which varies according to movement or relay piston 2. Chamber 17 communicates with a delivery passgeway or outlet 18 via which said chamber is communicated with brake cylinders shown symbollically. Chamber 17 is further communicable, when valve member 5 is in an unseated or open position relative to supply valve seat 7 and via a supply chamber 19, with a fluid pressure inlet 20 connecting with a fluid pressure supply reservoir.

In the upper part 1 of the housing, a pilot pressure valve assemblage which comprises a pilot valve member 21 having a fluted stem, and a pilot diaphragm 22 operably connected therewith, is disposed in such a manner that, when said pilot valve member is in an unseated or open position relative to a pilot valve seat 23 fixed in the housing, a fluid pressure connection is established, via a chamber 24 and a passageway 25, between a diaphragm control chamber 26, located above the diaphragm 3 (and in which fins 11 and 12 are located), and actuating control chamber 14. A spring 27 compressibly disposed between a closure cap 28 of housing part 1 and diaphragm 22 is adjustable by means of a screw 29 so as to set the pilot pressure at which the pilot valve member 21 closes.

A coaxial bore 30 in housing part 2 coaxially slidably accommodates the hollow rod member 9 whose upper open end, as already mentioned, forms the exhaust valve seat 8. When exhaust valve seat 8 occupies an unseated or exhaust position relative to valve member 5, fluid pressure may be vented via a coaxial passageway 31 in rod member 9 and a vent port 32 in housing part 2. The lower extremity of rod member 9 opposite valve seat 8 is operably engaged by a cam member 33, whose position is determined by vehicle weight or axle load. A shaft or load lever 34 with a lever 35 secured thereto provides an operating connection between cam 33 and the vehicle axle (not shown). Lever 35, in conventional manner, translates the degree of vehicle spring deflection, as determined by the vehicle load, through shaft 34 to cam 33. If more practical, a metal bellows (not shown) could be employed for translating vehicle spring deflection.

In operation, actuating brake pressure, as delivered by the motor vehicle brake valve and/or the trailer brake valve, at a pressure determined by initiation of a brake application by the operator, is also communicated to actuating control chamber 14 via passageway 15 and flows via passageway 25, past the normally open or unseated pilot valve 21, and via a passageway 36 to diaphragm control chamber 26 and the upper face of diaphragm 3. Such actuating brake pressure thus acting on the upper face of the diaphragm 3 effects either a reduction or an increase in control pressure in the case of low brake pressures supplied to the subsequent control valve devices and brake cylinders of the system in accordance with the load. When a certain pressure level, which can be set by means of screw 29, is reached in chamber 24, the force thereof acting on diaphragm 22 and against the opposing force of spring 27, causes said diaphragm to be moved in a right-hand direction and thereby moves pilot valve member 21 therewith to a closed or seated position on valve seat 23. At the same time, the brake pressure acting in control chamber 14 also acts on the upper pressure area 13 of piston 2 to cause downward movement thereof along with diaphragm 3. The two-way valve member 5 which also follows this downward movement under the influence of spring 6, first assumes a seated or cut-off position on exhaust valve seat 8 of rod member 9 to thus cut off communication to exhaust via passageway 31. Further downward movement of piston 2 causes supply valve seat 7 to open relative to valve member 5. Fluid pressure may now flow from the fluid pressure supply reservoir via supply inlet 20 into supply chamber 19, past said open valve member, via delivery chamber 17, and delivery passageway 18 to the brake cylinders.

During downward movement of piston 2, diaphragm 3 disengages from fins 12 fixed to housing part 1 and makes increasing contact with fins 11 fixed on said piston. Thus, the effective pressure area of diaphragm 3 is increasingly enlarged until the force acting on the underside of said diaphragm prevails over equals the force of actuating pressure acting on the upper pressure area 13 of relay piston 2. As a result, piston 2 moves upwardly again until valve member 5 occupies a seated position on both valve seats 7 and 8, or a lapped position in which the pressure now prevailing in the brake cylinders corresponds to the pressure as controlled in accordance with the weight of the load by cam member 33. With a full-load vehicle situation, the high point of cam member 33, by action of lever 35 and shaft 34, is in contact with the lower end of hollow rod member 9 to compress spring 6 and, therefore, require a higher pressure acting on surface 13 of relay piston 2 to cause said relay piston to move downwardly. Consequently, valve member 5 remains in an open or "full-load" position as long as such situation prevails and never assumes a lapped position. The pressure which can then be measured in the brake cylinders when the vehicle is fully loaded, corresponds to the pressure initiated by the operator and thus supplied to actuating control chamber 14 from the motor vehicle brake valve and/or the trailer brake valve which is at a 1:1 ratio. On the other hand, when the vehicle is empty or partially loaded, a lower or low point or surface of cam member 33 is placed in contact with the lower end of rod member 9, so that spring 6 is under less compression, and a lesser pressure acting on surface 13 of relay piston 2 is required to cause downward movement of said piston and consequently to cause a lower pressure to be delivered to the brake cylinders.

Figure 3:
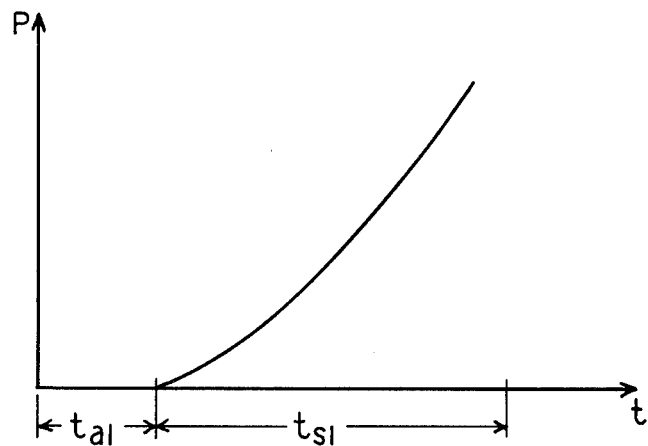
FIGS. 3, 4 and 5 are diagrams in graphic form, showing the relationship between pressure and time in the control process, FIG. 3 showing the ratio when using only one brake pressure control valve, FIG. 4 showing the ratio when using a brake pressure control valve and, in addition, a relay valve, and FIG. 5 showing the ratio when using the brake pressure regulating valve device embodying the invention.
Figure 4:
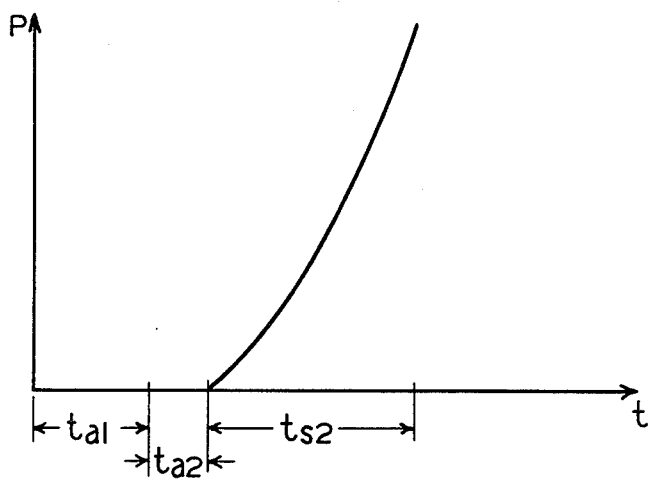
Figure 5:
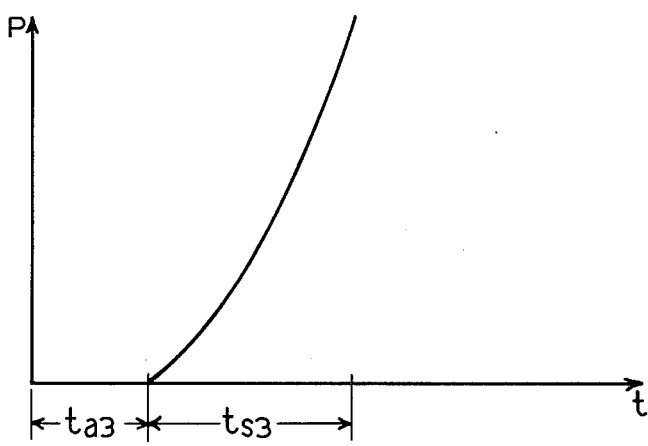

Reference is now to be made to the FIGS. 3, 4 and 5. FIGS. 3 and 5 show graphic diaphragms of the pressure variation as related to time in the control process from the beginning of the brake valve actuation until the moment at which the full preselected brake pressure is reached. The time pressure curve of FIG. 3 is characteristic of systems which use a conventional brake pressure control valve only. The pressure curve of FIG. 4 results when using a conventional brake pressure control valve and, in addition, a relay valve, and the pressure curve as per FIG. 5 results when employing the valve device embodying the invention herein disclosed.

For clearer comparison, the three curves of FIGS. 3 to 5 have been drawn above one another. It is quite clear that the respective time intervals representing the time from the beginning of the actuation of the brake valves to attainment of the full preselected brake pressure, shows, in each case, a decrease from FIGS. 3 to 5.

In the situation, as represented by FIG. 3, where a brake pressure control valve only is used, the result is a relatively short time interval $t_{a1}$ required for responding to operation of the brake pressure control valve, but on the other hand a relatively long time interval $t_{s1}$ is required for the brake pressure to reach the full preselected value. When using, in addition to the control valve, a relay valve, due to the additional response time $t_{a2}$ of the relay valve, a longer total response time interval, viz $t_{a1} + t_{a2} > t_{a1}$, results, as indicated in FIG. 4. In the same situation, however, a shorter pressure build-up time interval, that is, $t_{s2} < t_{s1}$, prevails which results in a shorter total time interval lapse before reaching the full preselected brake pressure. Expressed algebraically, $t_{a1} + t_{s1} > t_{a1} + t_{s2}$.

If, as shown in FIG. 5, the valve device embodying the invention herein disclosed is used, the result is a response time interval $t_{a3}$, which is practically equal to the response time interval of a conventional brake power regulator, because the valve device of the invention also used a unitary two-way valve, which results in approximately $t_{a3} = t_{a1}$. When using the valve device of the invention, the pressure build-up time $t_{s3}$ corresponds to the build-up time $t_{s2}$ of a conventional relay valve, i.e. approximately $t_{s3} = t_{s2}$ applies. Thus, in summary, taking into account the above relations, the following applies:

$$t_{a3} + t_{s3} = t_{a1} + t_{s2} < t_{a1} + t_{a2} + t_{s2} < t_{a1} + t_{s1}.$$

Having now described the invention, what we claim as new and desire to secure by Letters Patent, is:

1. A vehicle load-controlled brake pressure regulating valve device for fluid pressure operable brake systems, said regulating valve device including a relay valve portion having a first control chamber for controlling delivery of fluid pressure from a fluid pressure source to brake cylinders and a vehicle load-responsive portion for controlling operation of the relay valve portion, said relay valve portion having a relay piston subjectable to actuating brake pressure in said first control chamber supplied thereto via a brake valve, and a valve member carried by the relay piston and actuated thereby to an open position for effecting said delivery of fluid pressure to said brake cylinders in response to said actuating brake pressure when sufficient for overcoming opposing compressive force of a biasing spring also acting on the relay piston, the compression of said spring being varied by the position of a hollow rod member of said load-responsive portion interconnected between said relay piston and a load lever positionally adjustable in accordance with vehicle load, said rod member being engageable with said valve member for effecting operation thereof to an exhaust position in which fluid pressure is released from the brake cylinders upon reduction of fluid pressure in said control chamber, said relay valve portion and said vehicle-load responsive portion comprising a unitary brake pressure regulating valve device disposed in a common housing.

2. A brake pressure regulating valve device, according to claim 1, wherein said valve member comprises a single two-way valve means for controlling both delivery to and exhaust of fluid pressure from the brake cylinders.

3. A brake pressure regulating valve device, according to claim 2, wherein the two-way valve means is operably interposed between a fluid pressure inlet connected to said fluid pressure source, and with a fluid pressure delivery outlet connected to vehicle brake cylinders via a delivery chamber.

4. A brake pressure regulating valve device, according to claim 3, wherein the two-way valve means comprises a valve body normally biased by said spring toward a closed position relative to an exhaust valve seat formed on said hollow rod member for cutting off supply of fluid pressure from the inlet to the outlet, and being operable responsively to said pressure in said first control chamber sufficient for overcoming the spring force acting on the relay piston, to an open position relative to a supply valve seat formed on the relay piston so as to communicate fluid pressure from the inlet to the outlet and to the brake cylinders.

5. A brake pressure regulating valve device, according to claim 4, wherein fluid pressure supplied from the supply pressure source to the brake cylinders via the open two-way valve member acts on the relay piston in a direction opposite to that of the action of the pressure in said first control chamber supplied via the brake valve.

6. A brake pressure regulating valve device, according to claim 5, wherein the relay valve portion comprises differential piston means comprising said relay piston and a diaphragm, said diaphragm being subjectable to a pilot pressure acting thereon in one direction corresponding to that of the actuating brake pressure acting on said relay piston and supplied thereto via a pilot pressure valve assemblage adjustable for controlling the pressure of said pilot pressure by said actuating brake pressure, as desired, and is acted upon, in an opposite direction, by pressure supplied from the supply source to the brake cylinders via said inlet and the two-way valve means when in its said open position.

7. Brake pressure regulating valve device, according to claim 6, wherein the pilot pressure valve assemblage comprises a pilot valve member, a pilot diaphragm operably connected therewith, and a compressibly adjustable spring for biasing said pilot diaphragm in a direction opposing that of the fluid pressure acting thereon.

* * * * *